(12) United States Patent
Yoshida et al.

(10) Patent No.: US 6,723,467 B2
(45) Date of Patent: Apr. 20, 2004

(54) SEPARATOR FOR BATTERY AND BATTERY

(75) Inventors: Yasuhiro Yoshida, Tokyo (JP); Osamu Hiroi, Tokyo (JP); Kouji Hamano, Tokyo (JP); Daigo Takemura, Tokyo (JP); Sigeru Aihara, Tokyo (JP); Hisashi Shiota, Tokyo (JP); Jun Aragane, Tokyo (JP); Hiroaki Urushibata, Tokyo (JP); Michio Murai, Tokyo (JP); Takayuki Inuzuka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 252 days.

(21) Appl. No.: 09/789,554

(22) Filed: Feb. 22, 2001

(65) Prior Publication Data
US 2001/0005560 A1 Jun. 28, 2001

Related U.S. Application Data

(63) Continuation of application No. PCT/JP99/03321, filed on Jun. 22, 1999.
(51) Int. Cl.$^7$ ............................................... H01M 2/16
(52) U.S. Cl. ..................................... 429/144; 429/254
(58) Field of Search ................................ 429/144, 145, 429/254

(56) References Cited

U.S. PATENT DOCUMENTS 5,741,608 A * 4/1998 Kojima et al. .......... 429/144 X
5,981,107 A    11/1999 Hamano et al.
6,024,773 A    2/2000  Inuzuka et al.
6,051,342 A    4/2000  Hamano et al.
6,124,061 A    9/2000  Hamano et al.
6,136,471 A    10/2000 Yoshida et al.
6,194,098 B1 * 2/2001  Ying et al. ............. 429/144 X
6,231,626 B1   5/2001  Yoshida et al.
6,232,014 B1   5/2001  Shiota et al.
6,235,066 B1   5/2001  Inuzuka et al.
6,291,102 B1   9/2001  Yoshida et al.

FOREIGN PATENT DOCUMENTS

| JP | 60-74341 | 9/1985 |
| JP | 08-87995 | 4/1996 |
| JP | 08-236093 | 9/1996 |
| JP | 09-161757 | 6/1997 |
| JP | WO 00/79618 A1 | 12/2000 |

* cited by examiner

*Primary Examiner*—John S. Maples
(74) *Attorney, Agent, or Firm*—Oblon, Spivak, McClelland, Maier & Neustadt, P.C.

(57) ABSTRACT

Conventional separators had a function that their melting made minute holes inside the separator smaller, leading to cut off of ion conductivity in temperature increase due to unusual conditions such as short circuit. However, there was a problem that, at a temperature higher than a certain degree, not only the minute holes were closed but also the separator itself was melted to cause deformation of the separator such as shrink and generation of holes due to melting and insulation was broken. The present invention has been carried out in order to solve the above problems. The separator for batteries of the present invention comprises a first porous layer (3a) containing a thermoplastic resin as a main component and a second porous layer (3b) laminated on the first porous layer (3a), which has higher heat resistance than that of the first porous layer (3a).

9 Claims, 2 Drawing Sheets

SEPARATOR FOR BATTERY AND BATTERY

This application is a continuation of PCT/JP99/03321filed Jun. 22, 1999.

TECHNICAL FIELD

The present invention relates to a separator for a battery. More particularly, the present invention relates to a separator for a battery having high safety, a battery using the same and to a process for preparing the separator.

BACKGROUND ART

There is a growing demand for downsizing and lightening of portable electric appliances and the achievement greatly depends upon improvement of battery performance. There have been various development and improvement of batteries in order to meet the demand. Performance required to a battery includes high voltage, high energy density, safety, variety of shape and the like. A lithium ion battery is a non-aqueous electrolytic solution battery, which is expected to achieve high voltage and high energy density, and active improvement is going on even at present. Also, there has been carried out research for lithium metal batteries which is expected to have further higher energy density.

These non-aqueous batteries comprise a positive electrode, a negative electrode and an ion conductive layer sandwiched between the both electrodes as major components. In lithium ion batteries practically used these days, material in a shape of a plate obtained by applying powder such as lithium cobalt oxide to a current collector is used as an active material for the positive electrode. In the same manner, material in a shape of a plate obtained by applying powder such as carbon material to a current collector is used as an active material for the negative electrode. In order for these electrodes to function as a battery, it is necessary to have a layer between the both electrodes through which lithium ions can move and which has no electric conductivity. Generally, a porous film separator such as polyethylene is used as the ion conductive layer. It is interposed between the both electrodes and non-aqueous solution is filled to constitute the ion conductive layer.

As well as a function to electrically insulate the both electrodes, the separator also has safety improvement ability that it melts and makes minute holes inside the separator smaller, leading to cutting off ion conductivity in temperature increase due to unusual conditions such as short circuit. However, the above separator had a problem that not only the minute holes were closed but also at a temperature higher than a certain degree, the separator itself melted to cause deformation of the separator such as shrink and generation of holes due to melting and insulation was broken. At this time, since large short-circuit current is generated between the positive electrode and the negative electrode, there has been a problem that the temperature of the battery further increases due to exothermic reaction, leading to further increase of short-circuit current.

In Japanese Unexamined Patent Publication No. 241655/1998, there is disclosed a separator obtained by solidifying insulating inorganic particles with a binder. However, such a separator had problems that it could not control ion conductivity at a high temperature and that preparation of the battery became complicated.

The present invention has been carried out in order to solve the above problems. The object of the present invention is to provide a highly safe separator capable of efficiently cutting off ion conductivity at a high temperature without the risk that the separator melts to cause break of insulation, a battery using the same and a process for preparing the above separator.

DISCLOSURE OF INVENTION

The first separator for batteries of the present invention comprises a first porous layer containing a thermoplastic resin as a main component and a second porous layer placed on the first porous layer which has higher heat resistance than that of the first porous layer.

According to this, there is an effect that highly safe separator capable of efficiently cutting off ion conductivity at a high temperature can be obtained without the risk of its melting which causes break of insulation.

The second separator for batteries of the present invention has structure that the second porous layer having higher heat resistance than that of the first porous layer is interposed by the first porous layers which contains a thermoplastic resin as a main component.

According to this, there is an effect that highly safe separator capable of efficiently cutting off ion conductivity at a high temperature can be obtained without the risk of its melting which causes break of insulation. Also, there is an effect that a separator which can easily handle is prepared.

The third separator for batteries of the present invention is that in the first separator, the second porous layer comprises fine particles having higher heat resistance than that of the first porous layer.

According to this, there is an effect that thin and fine porous layer can be easily formed and that it gives flexibility to the second porous layer.

The first battery of the present invention comprises a separator interposed between a positive electrode and a negative electrode, wherein the separator comprises a first porous layer containing a thermoplastic resin as a main component and a second porous layer having higher heat resistance than that of the first porous layer laminated on the first porous layer.

According to this, there is an effect that a highly safe battery can be obtained since current increase between the electrodes can be controlled when a temperature is increased by exothermic reaction due to short-circuit.

The second battery of the present invention comprises a separator interposed between a positive electrode and a negative electrode, wherein the separator has structure that the second porous layer having higher heat resistance than that of the first porous layer is interposed by the first porous layers which have a thermoplastic resin as a major component.

According to this, there is an effect that a highly safe battery can be easily obtained even when a temperature is increased.

The first process for preparing the separator of the present invention comprises forming a second porous layer by applying fine particles whose heat resistance is higher than that of the first porous layer onto the first porous layer containing a thermoplastic resin as a main component.

According to this, there is an effect that highly safe separator capable of efficiently cutting off ion conductivity at a high temperature can be easily prepared without the risk that the separator melts to break insulation.

BEST MODE FOR CARRYING OUT THE INVENTION

Generally, a porous film comprising a thermoplastic resin such as polypropylene or polyethylene is used as a separator. This separator has a function that the thermoplastic resin melts and minute holes of the separator become smaller, leading to cut off of ion conductivity, when a temperature increases under unusual conditions such as short circuit. However, at a temperature higher than a certain degree, the separator itself melts to break insulation. The separator of the present invention comprises a porous film containing these thermoplastic resins as a main component (hereinafter referred to as the first porous layer) and a porous layer laminated thereon having higher heat resistance than that of the first layer (hereinafter referred to as the second porous film). This construction controls deformation of the separator such as shrink and generation of holes due to melting even when a temperature becomes higher than the melting point of the thermoplastic resin, because there is no melting of the second porous layer having heat resistance at a higher temperature than the melting point.

Figure 1:
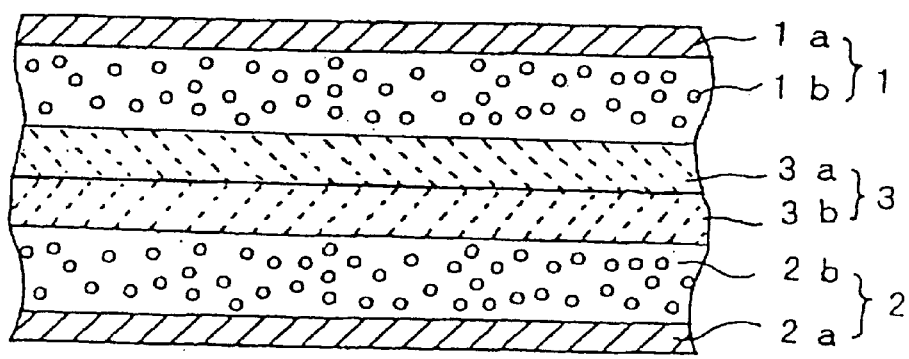
FIG. 1 is a cross sectional view illustrating the construction of a battery of an embodiment of the present invention.

FIG. 1 is a cross sectional view illustrating one embodiment of the present invention. In the figure, numeral 1 indicates a positive electrode in which a positive electrode active material layer 1b is formed on the surface of a positive electrode current collector 1a. Numeral 2 indicates a negative electrode in which a negative electrode active material layer 2b is formed on the surface of a negative electrode current collector 2a. Numeral 3 indicates a separator interposed between the positive electrode 1 and the negative electrode 2, and it is obtained by laminating a first porous layer 3a containing a thermoplastic resin as a main component onto a second porous layer 3b whose heat resistance is higher than that of the first porous layer 3a. And it retains an electrolyte containing, for example, lithium ions.

Referring to the thermoplastic resin which is the main component of the first porous layer 3a, its temperature of softening and shrink of the minute holes may be 60° C. to 150° C. Examples thereof are a polyolefin such as polypropylene or polyethylene, and a copolymer or a homopolymer of monomers having a substitional group such as a carboxyl group, an ester group, an aliphatic group or an aromatic group.

The second porous layer 3b may be a layer which does not melt even at the temperature where the thermoplastic resin softens and the minute holes shrink. Preferably, the layer may have less chance of shrink compared to the separator prepared only from the thermoplastic resin. Without melting of the second porous layer 3b, it is possible to control deformation and hole generation of the separator comprising the thermoplastic resin even if the first porous layer does not maintain its shape. The effect is larger if there is no shrink in the second porous layer 3b.

As the component forming the second porous layer 3b, it may be an organic or inorganic powder (fine particles), an organic or inorganic fiber, or an organic or inorganic plate whose softening temperature is at least 120° C. Also, it may be an inorganic salt or an organic polymer, whose thermal deforming temperature of the porous layer becomes higher than that of the first porous layer 3a by mixing with the other components forming the second porous layer 3b. The component may preferably be less soluble to the electrolytic solution of a battery, but there is no problem if the other mixed component controls melting at a high temperature.

There is an advantage that a thin and fine porous layer is easily formed, when fine particles having high heat resistance is used as the second porous layer 3b component. The particles may be the one which is non-conductive and insoluble to the electrolyte. Organic or inorganic material such as silica, alumina, titanium oxide or clay may be used without any particular limitation.

The average particle size of the above particles is preferably at most 0.5 μm. The particles having larger size than that do not efficiently aggregate and sufficient ion conductivity improvement of the electrolytic gel can not be expected when the aggregated particles are mixed. The average particle size of the aggregate is preferably at least 0.2 μm to at most 2.0 μm. When it is smaller than 0.2 μm, sufficient ion conductivity improvement of the electrolytic gel can not be expected when it is mixed. When it is larger than 2.0 μm, it is not preferable since film thickness becomes too large.

If the second porous layer 3b is formed by applying the above particles on the first porous layer 3a for preparing the separator 3 of the present invention, the process involves excellent mass-productivity at a low cost. The particles can be mixed with various solvent and binder to apply as slurry. As the solvent, any solvent can be used if the particles do not dissolve in the solvent and drying by evaporation is possible. As the binder, any binder can be used if it dissolves to solvent but does not dissolve in the electrolytic solution of the battery. As the application method, it is possible to employ Doctor Blade method, roller application, screen-printing, spraying and the like.

Figure 2:
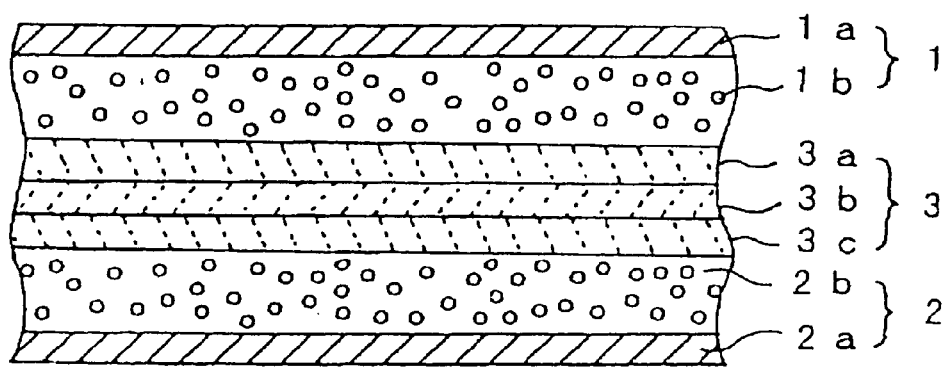
FIG. 2 is a cross sectional view illustrating the construction of a battery of an another embodiment of the present invention.

FIG. 2 is a cross sectional view illustrating another embodiment of the present invention. In the figure, numeral 3c indicates a third porous layer comprising a thermoplastic resin as a main component which is constructed from the same material as the first porous layer 3a. The separator 3 in FIG. 2 is formed with the first and third porous layers having a thermoplastic resin as a main component on the both surfaces of the second porous layer 3b. The separator 3 has a function that the second separator 3b connects two of the first porous layers 3a. And since the both surfaces are the first porous layers, there is an effect that the separator can be easily handled.

The battery according to the present invention shown in FIGS. 1 and 2 is a battery whose battery body comprises single electrode lamination. The same separator construction as in the embodiments of the present invention may be applied to a battery of laminated type, which comprises a battery body wherein each of positive electrodes and negative electrodes are placed alternatively between a plurality of separators cut into each piece, a battery body wherein each of positive electrodes and negative electrodes are placed alternatively between a band of winding separator, and a battery body wherein each of positive electrodes and negative electrodes are placed alternatively between a band of folded separator.

Hereinafter, more concrete examples of the present invention are illustrated. However, the present invention is not intended to be limited to these examples.

EXAMPLE 1

(Process for Preparing Separator)

Alumina staple (staple diameter of 2 to 3 μm, TFA-05 available from NICHIAS CORPORATION) was mixed with 10% by weight of poly(vinylidene fluoride). To N-methylpyrolidone was added 20% by weight of the mixture, and it was mixed. It was applied to a porous polypropylene sheet (trade name CELL GUARD #2400 available from Höchst Celanese Co., Ltd.) according to Doctor Blade method and was dried to prepare the separator 3 wherein the second porous film 3b comprising the alumina staple was laminated on the first porous layer 3a.

(Process for Preparing Positive Electrode)

A paste for the positive electrode active material was prepared by mixing 87% by weight of $LiCoO_2$, 8% by weight of powder graphite KS-6, and 5% by weight of poly(vinylidene fluorid)e as a binder resin. It was applied, in a thickness of about 100 μm, to aluminum foil having a thickness of 20 μm which forms the positive electrode current collector 1a according to Doctor Blade method and the positive electrode 1 was formed.

(Process for Preparing Negative Electrode)

A paste for the negative electrode active material was prepared by mixing 95% by weight of mesophase microbeads carbon (available from Osaka Gas Co., Ltd.) and 5% by weight of poly(vinylidene fluoride) as a binder. It was applied, in a thickness of about 100 μm, to copper foil having a thickness of 12 μm which forms the negative electrode current collector 2a according to Doctor Blade method and the negative electrode 2 was formed.

(Process for Preparing Battery)

Each of the positive and negative electrodes was cut into a size of 50 mm×200 mm and terminals for current collector were connected thereto. The prepared separator 3 was cut into a size of 52 mm×210 mm, and it was layered on the both surfaces of the positive electrode 1. The negative electrode 2 was also layered thereon. It was rolled out in width of about 5 cm and fixed by using a strip of Kapton tape. The taken electrode was put into cylindrically processed film of aluminum laminated sheet. After sufficient drying, thereto was injected an electrolytic solution containing lithium hexafluorophosphate as an electrolyte with ethylene carbonate and 1,2-dimethoxyethane as a solvent. And then the aluminum laminated film was sealed to prepare a battery.

(Evaluation of Battery)

As to the characteristics of the prepared battery, energy density per weight was 70 Wh/kg.

When the battery was heated to 120° C., impedance value of the battery was increased about three orders of magnitude, though it was widely varied depending on the thickness of the second porous layer 3b. It was found that there was an effect that melting of the polypropylene part of the separator 3 (the first porous layer 3a) shut down ion conductivity. Also, in case of heating a battery in charging condition to 150° C., there were found no unusual conditions such as short-circuit of the electrodes due to melting of the separator 3.

Comparative Example 1

A battery was prepared as the battery in Example 1 in a condition that a separator 3 comprises only porous polypropylene sheet (trade name CELL GUARD #2400 available from Höchst Celanese Co., Ltd.) without forming the second porous layer 3b comprising the alumina staple.

In case of heating the battery in charging condition to 150° C., the separator melted and short-circuit of the electrodes was observed.

EXAMPLE 2

(Process for Preparing Separator)

Glass fiber (having a diameter of 5 μm) was measured by using a micrometer to spread it as uniformly as possible to the extent that the thickness becomes at most 20 μm. Thereto was sprayed 10% poly(vinyl alcohol) aqueous solution to mount a porous polypropylene sheet (trade name CELL GUARD #2400 available from Höchst Celanese Co., Ltd.) thereon. After sufficient drying, there was prepared a separator 3 wherein a second porous film 3b comprising the glass fiber is laminated on a first porous layer 3a.

(Evaluation of Battery)

By using this separator, a battery was prepared in the same manner as in Example 1. As to the characteristics of the battery, energy density per weight was 60 Wh/kg.

Also, in case of heating the battery in charging condition to 150° C., there were found no unusual conditions such as short-circuit of the electrodes due to melting of the separator 3.

EXAMPLE 3

(Process for Preparing Separator)

Alumina ultra-fine particles (available from Degussa Co., Ltd.) and 30% by weight of poly(vinylidene fluoride) were stirred by using a colloid mill to prepare a mixture containing about 15% by weight thereof based on N-methylpyrolidone. It was applied to a porous polypropylene sheet (trade name CELL GUARD #2400 available from Höchst Celanese Co., Ltd.) according to screen-printing and was dried to prepare a separator 3 wherein a second porous film 3b comprising the alumina ultra-fine particles was laminated on a first porous layer 3a.

(Evaluation of Battery)

By using this separator, a battery was prepared in the same manner as in Example 1. As to the characteristics of the battery, energy density per weight was 70 Wh/kg.

Also, in case of heating the battery in charging condition to 170° C., there were found no unusual conditions such as short-circuit of the electrodes due to fusion of the separator 3.

EXAMPLE 4

(Process for Preparing Separator)

Cross-linked acrylic ultra-fine particles (MP300F available from Soken Chemicals Co., Ltd.) and 30% by weight of poly(vinylidene fluoride) were stirred by using a colloid mill to prepare a mixture containing about 10% by weight thereof based on N-methylpyrolidone. It was applied to a porous polypropylene sheet (trade name CELL GUARD #2400 available from Höchst Celanese Co., Ltd.) according to screen-printing and was dried to prepare a separator 3 wherein a second porous film 3b comprising the cross-linked acrylic ultra-particles was laminated on a first porous layer 3a.

(Evaluation of Battery)

By using this separator, a battery was prepared in the same manner as in Example 1. As to the characteristics of the battery, energy density per weight was 75 Wh/kg.

Also, in case of heating the battery in charging condition to 150° C., there were found no unusual conditions such as short-circuit of the electrodes due to fusion of the separator 3.

EXAMPLE 5

(Process for Preparing Separator)

Cross-linked acrylic ultra-fine particles (MP300F available from Soken Chemicals Co., Ltd.) and 30% by weight of poly(vinylidene fluoride) were stirred by using a colloid mill to prepare a mixture containing about 10% by weight thereof based on N-methylpyrolidone. It was applied to a porous polypropylene sheet (trade name CELL GUARD #2400 available from Höchst Seranies Co., Ltd.) according to screen-printing. A porous polypropylene sheet (trade name CELL GUARD #2400 available from Höchst Celanese Co., Ltd.) was laminated to the applied surface. Then it was dried to prepare a separator 3 having the second porous film 3b comprising cross-linked acrylic ultra-fine particles between first porous layers 3a and 3c.

(Evaluation of Battery)

By using this separator, a battery was prepared in the same manner as in Example 1. As to the characteristics of the battery, energy density per weight was 55 Wh/kg.

Also, in case of heating the battery in charging condition to 170° C., there were found no unusual conditions such as short-circuit of the electrodes due to fusion of the separator 3.

Additionally, the separator shown in the above examples can be used not only for a lithium ion secondary battery but also for a primary battery such as a lithium/manganese dioxide battery or for another secondary battery.

Furthermore, the separator can be further used for a primary and secondary battery whose battery body is a laminated type, a winding type, a folded type, a button type and the like.

INDUSTRIAL APPLICABILITY

The separator for batteries, the battery and the process for preparing the separator of the present invention are applicable not only to a lithium ion secondary battery but also to a primary battery such as a lithium/manganese dioxide battery or for another secondary battery.

Furthermore, the separator can be further used for a primary and secondary battery whose body is a laminated type, a winding type, a folded type, a button type and the like.

What is claimed is:

1. A separator for batteries, comprising a first porous layer containing a thermoplastic resin as a main component, and a second porous layer laminated on the first porous layer which has a higher heat resistance than said first porous layer, wherein all of the particles of the second porous layer comprise particles having an average particle size of at most 0.5 $\mu$m.

2. The separator for batteries of claim 1, wherein the second porous layer is interposed by the first layer.

3. The separator for batteries of claim 1, wherein said thermoplastic resin comprises polyolefin or a polymer or copolymer having substituent groups comprising carboxyl, ester, an aliphatic group, or an aromatic group.

4. The separator for batteries of claim 1, wherein said particles of said second porous layer have a softening temperature of at least 120° C.

5. The separator for batteries of claim 1, wherein aggregates of said particles have an average particle size of 0.2 to 2.0 $\mu$m.

6. A battery, comprising a separator which is interposed between a positive electrode and a negative electrode,
wherein the separator comprises a first porous layer containing a thermoplastic resin as the main component and a second porous layer laminated on the first porous layer which has a higher heat resistance than said first porous layer, and
wherein all of paticles of the second porous layer comprise particles having an average particle size of at most 0.5 $\mu$m.

7. The battery of claim 6, wherein the second porous layer is interposed by the first porous layer.

8. The battery of claim 6, wherein said thermoplastic resin comprises polyolefin or a polymer or copolymer having substituent groups comprising carboxyl, ester, an aliphatic group, or an aromatic group.

9. The battery of claim 6, wherein said particles of said second porous layer have a softening temperature of at least 120° C.

* * * * *